United States Patent
Lavigne

(10) Patent No.: US 8,002,427 B2
(45) Date of Patent: Aug. 23, 2011

(54) SOLAR RECHARGEABLE LIGHT EMITTING DIODE LIGHTS

(75) Inventor: Dawn Emily Marilyn Lavigne, Lemmon, SD (US)

(73) Assignee: Candew Scientific, LLC, Lemmon, SD (US)

( * ) Notice: Subject to any disclaimer, the term of this patent is extended or adjusted under 35 U.S.C. 154(b) by 0 days.

(21) Appl. No.: 11/746,167

(22) Filed: May 9, 2007

(65) Prior Publication Data
US 2008/0170389 A1 Jul. 17, 2008

Related U.S. Application Data

(60) Provisional application No. 60/879,927, filed on Jan. 12, 2007.

(51) Int. Cl.
*E01F 9/00* (2006.01)
(52) U.S. Cl. .......... 362/153.1; 362/183; 362/152
(58) Field of Classification Search .......... 362/153.1, 362/183–186, 190, 191, 194, 201, 202, 205, 362/208, 231, 236, 344, 249, 251, 252, 396, 362/470, 800; 315/185 S, 312, 324; 320/101, 320/102
See application file for complete search history.

(56) References Cited

U.S. PATENT DOCUMENTS

| | | | |
|---|---|---|---|
| 4,816,970 A | | 3/1989 | Garcia, Jr. |
| 4,841,278 A | * | 6/1989 | Tezuka et al. ............. 340/908.1 |
| 4,929,942 A | * | 5/1990 | Niimi ......................... 340/908.1 |
| 4,977,488 A | | 12/1990 | Spotts et al. |
| 5,055,984 A | | 10/1991 | Hung et al. |
| 5,262,756 A | | 11/1993 | Chien |
| 5,412,381 A | * | 5/1995 | Dicks ......................... 340/908.1 |
| 5,782,552 A | * | 7/1998 | Green et al. .................. 362/183 |
| 5,984,570 A | * | 11/1999 | Parashar ........................ 404/14 |
| 6,072,280 A | * | 6/2000 | Allen ......................... 315/185 S |
| 6,082,877 A | * | 7/2000 | Hughes ........................ 362/360 |
| 6,174,070 B1 | * | 1/2001 | Takamura et al. ............ 362/183 |
| 6,210,017 B1 | * | 4/2001 | Miura et al. ................ 362/153.1 |
| 6,459,218 B2 | * | 10/2002 | Boys et al. .................... 315/324 |
| 6,461,019 B1 | | 10/2002 | Allen |
| 6,497,502 B1 | | 12/2002 | Clift et al. |
| 6,602,021 B1 | * | 8/2003 | Kim ............................. 404/16 |
| 6,726,398 B2 | * | 4/2004 | Hamakawa et al. ............ 404/13 |
| 6,948,826 B2 | | 9/2005 | Fogerlie |

(Continued)

FOREIGN PATENT DOCUMENTS

DE 3641396 A1 6/1988

(Continued)

OTHER PUBLICATIONS

English Translationo of DE202005004052U produced by an automated process.*

*Primary Examiner* — Hargobind S Sawhney
(74) *Attorney, Agent, or Firm* — McKee, Voorhees & Sease, P.L.C.

(57) ABSTRACT

A Christmas/Decorative light without wires. This is a solar rechargeable indoor/outdoor Christmas/Decorative light that is characterized by a bright long lasting LED and long lasting energy source. The rechargeable energy storage device is electrically coupled to a flexible solar array that powers the light. The light assembly is constructed with a small, flexible solar array that allows it to be used on a variety of light sizes including mini-light, C6, C7, and C9 bulb. The LED holder has a nearly unbreakable lens for illumination and allows for varying colors. The solar array is mounted on the casing and is maximized to collect the ambient/solar energy during the daylight hours. The light assembly is designed with a clip that allows it to be attached/mounted to a variety of indoor and outdoor structures including Christmas Trees and houses.

16 Claims, 4 Drawing Sheets

U.S. PATENT DOCUMENTS

| | | | |
|---|---|---|---|
| 2004/0252492 A1* | 12/2004 | Peterson | 362/183 |
| 2007/0034248 A1* | 2/2007 | Romano et al. | 136/244 |

FOREIGN PATENT DOCUMENTS

| | | |
|---|---|---|
| DE | 3735217 A * | 4/1989 |
| DE | 4120849 A1 | 1/1993 |
| DE | 19708397 A1 | 9/1998 |
| DE | 19734345 A1 | 2/1999 |
| DE | 20111021 U1 | 3/2002 |
| DE | 202005004052 U1 | 7/2005 |
| JP | 2000096528 A * | 4/2000 |
| MX | 1062170 | 2/2006 |

\* cited by examiner

SOLAR RECHARGEABLE LIGHT EMITTING DIODE LIGHTS

CROSS-REFERENCE TO RELATED APPLICATIONS

This application claims priority under 35 U.S.C. §119 of a provisional application Ser. No. 60/879,927 filed on Jan. 1, 2007, which application is hereby incorporated by reference in its entirety.

BACKGROUND OF THE INVENTION

The present invention generally relates to a solar powered light, and more specifically, to a solar rechargeable light that utilizes at least one light emitting diode (LED). The use of solar energy as a source of energy for various types of devices is well known in the art and has been shown to be advantageous in situations where other sources of power are unavailable. For example, outdoor landscape lighting is frequently solar powered.

Solar power is advantageous in situations where other power sources are unavailable because solar energy can be collected during the daylight hours via a solar panel. In certain situations, the solar cell can directly power a device, but it is more common to have the solar cell charge and maintain an energy storage device. These devices can range from batteries to capacitors. The energy stored in the energy storage device is then used to power and operate the attached light.

Solar panels are frequently used to charge batteries that power lights at night in various applications. Some of these applications include outdoor landscaping lights, Christmas lights, and even road signs along desolate portions of interstates. Use of solar energy in these applications are becoming more and more popular because of the reduced environmental impact solar cells have on the environment verses the more traditional power sources.

There have been many U.S. patents that utilize solar powered lights. For example, U.S. Pat. No. 5,055,984 discloses a solar powered light that is used to illuminate the ground, walkways, and or walls. U.S. Pat. No. 6,948,826 utilizes a solar powered light to illuminate steps at night, while U.S. Pat. No. 5,262,756 utilizes a solar powered light to illuminate road signs to warn the public of potential driving hazards. Each of these applications use a traditional solar cell array that requires complicated devices to track the movement of the sun across the sky to effectively utilize the daytime sunlight. Additionally, the size of the accompanying storage devices limits the use of the designs in smaller applications.

Interest in solar powered lighting has also increased with the improvement of LED technology. LED lighting arrays offer a low power consumption device that provides better light emission for a comparable amount of energy used when compared to traditional lighting, such as incandescence and florescent lighting. Because of the LED characteristics, LED's are being used in more and more lighting applications. For example, U.S. Pat. No. 6,461,019 discloses an LED light string that requires an AC to DC conversion. The light string utilizes three independent wires in combination to power each LED. Because of the number of wires, the light string is easily tangled and damaged. Moreover, the three wire combination used increases the opportunity for failure of the light string.

U.S. Pat. No. 6,497,502 discloses an electrical candlestick device. The device utilizes a light emitting device, such as a diode, at the top of a plastic candlestick portion. The preferred embodiment utilizes a traditional incandescent light and an AC power source to provide a single decorative light. Unfortunately, the size of the candlestick is problematic and makes it difficult to use such a system for Christmas lighting. Thus, there is a need for a compact system that provides a rechargeable LED light in all weather environments.

BRIEF SUMMARY OF THE INVENTION

Therefore, it is a primary object, feature or advantage of the present invention to improve over the state of the art.

It is therefore a further feature of the present invention to provide solar powered lights that utilize light emitting diodes.

It is still a further feature of the present invention to provide solar powered lights having a LED bulb that is powered by a solar cell.

Yet another feature of the present invention is the use of a flexible solar cell that is incorporated into the base of the individual light base.

Still yet another feature of the present invention is the simplification of the necessary circuitry to power a LED light.

It is a further feature of the present invention to provide a casing that supports the functionality of the light.

These, as well as other features and advantages of the present invention, will become apparent from the following specification and claims.

According to one embodiment of the present invention, lights are powered via a circuit that utilizes a solar cell, battery, LED and micro technology so that each light is independent of any other light. Preferably, a long lasting LED is used for illumination within a plastic bulb and a rechargeable coin cell micro battery is used for energy storage. The LED, battery and the necessary connections are all preferably assembled into a singe casing. The casing is best made from a molded plastic material as a single piece, though other materials and additional pieces assembled together may be used. The casing may be of any suitable shape and may include holes for the wiring of components, a switch, loops for a connector, such as a string, or another type of securing means to connected the casing to a clip or other mounting means. Preferably a flexible solar array is wrapped around the base or exterior of the casing to collect energy.

The LED lights in the present invention use very little current, have a long life span and generate little heat. Because of the minimal load that the LED requires to provide sufficient light for the application, a small solar array can be used. Using a flexible solar cell allows for the solar cell to encircle the base of the lights casing. By encircling the casing, energy adsorption can take place without having to manually position the array to follow the source of light. The wrapping of the base allows for 360-degree natural light absorption platform. The elimination of a tracking device drastically simplifies the device over other solar powered lights.

Because of the simplicity of each light having its own DC power source (the solar array), each light is independent. The failure of a single light does not affect the remaining lights in the grouping. Additionally, because each light has the solar array integrated into the base, there is no external wiring to be damaged or affected by external environmental conditions.

Another aspect of the present invention is that the LED light and lens assembly is that the base of the light can be attached or affixed to a clamp, clip, mount, screw or other attachment device. The clip is preferably attached to the bottom or side of the base to allow the ease of clipping the entire assembly to trees or buildings.

Still another aspect of the present invention is the decrease in potential dangers and hazards inherent in traditional decorative lighting. Because each light is independent from another, the electrical connections take place within the light housing, reducing the risk of electrical burns. Additionally, the independent nature of light assembly allows for the light to be used at locations that would normally require the use of an extension cord. The elimination of the use of extension cords removes potential trip hazards, as well as potential for electrocution.

Another aspect of the present invention is the incorporation of a light sensor and/or an on/off switch into the base. The light sensor is preferably a light detecting diode which allows for the switching between battery charging during daylight hours and battery discharging during night time or dark hours. The on/off switch allows for the convenience of storing the lighting display when not in use and the light sensor allows for power saving during daylight hours. Because each light has a permanent power source attached to the energy storage device, the on/off switch allows for the solar cell to be disconnected from the battery while not in use to increase the life of the battery.

The present invention has many potential uses. These uses range from decorative Christmas lighting to automotive lighting to even hazard and emergency lighting situations, any situation where there is a need for lighting and there is no convenient access to an AC power source.

DETAILED DESCRIPTION OF THE PREFERRED EMBODIMENT

The present invention will be described as it applies to its preferred embodiment. It is not intended that the present invention be limited to the described embodiment. It is intended that the invention cover all modifications and alternatives which may be included within the spirit and scope of the invention.

Figure 1:
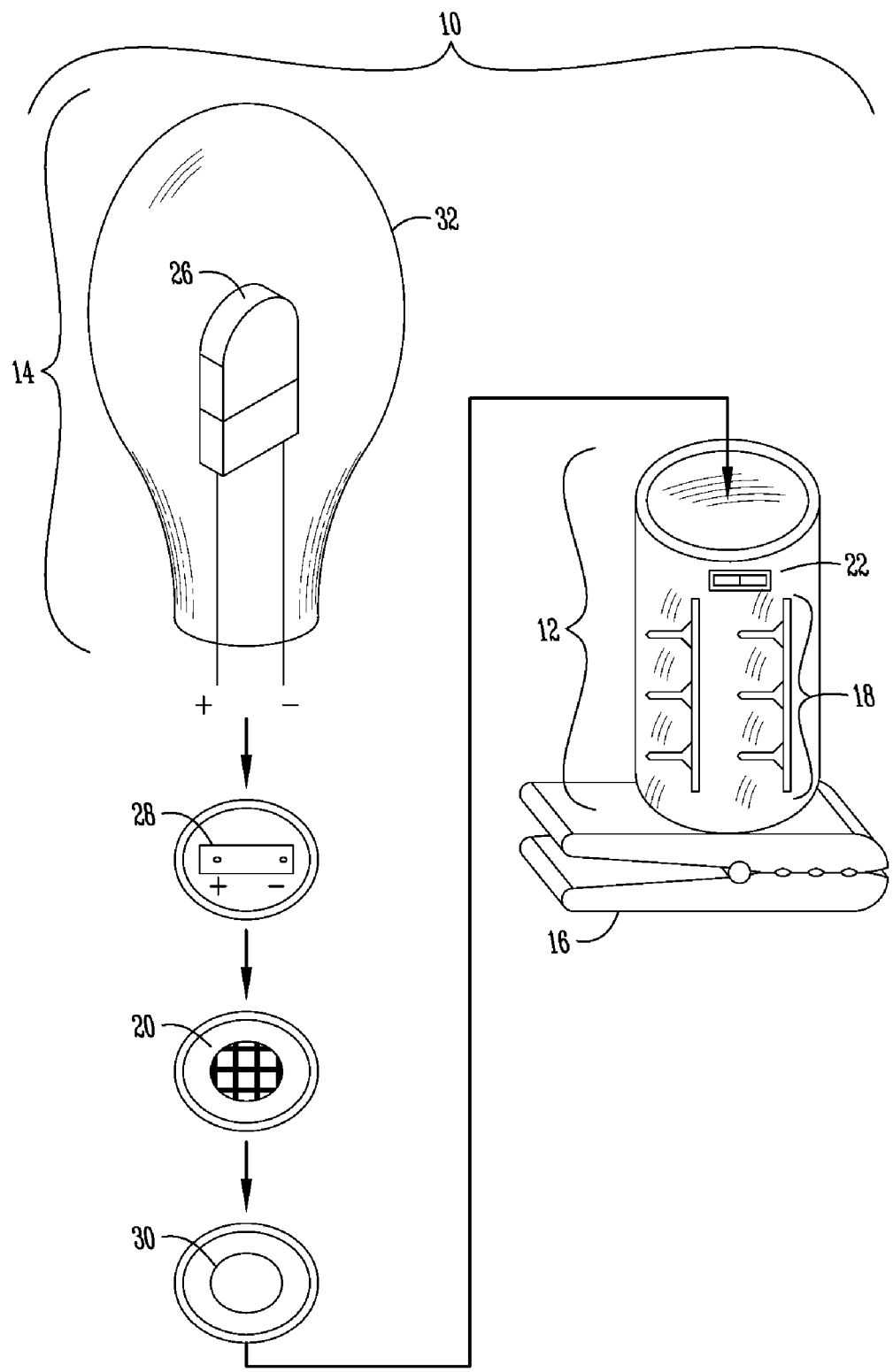
FIG. 1 is a cross-sectional view of a solar powered light assembly according to one embodiment of the present invention.

Now, referring to the attached drawings, FIG. 1 shows an exploded view of one embodiment of the present invention. As shown, the light assembly 10 has a base or casing 12 that supports the bulb 14. A mount, clip, clamp, sticker, screw or other attachment device 16 is affixed to the opposite end of the casing 12 relative to the bulb 14. The casing 12 is generally a hollow structure, preferably a tube, which houses the electrical connection of the light assembly 10. The casing 12 can be constructed of any durable and rigid material that may be stamped, injected modeled or otherwise formed. Suitable materials include plastic or composite materials that are substantially impervious to fracturing. The material must have enough rigidity in the material to so that the installed light assembly maintains its shape.

Preferably, a solar array 18 is flexible and wound about the casing 12. In this embodiment, the solar array 18 is coated for protection from the elements during unfavorable weather conditions. It is also secured from contaminants which may be present when the light assembly 10 is handled. The solar array 18 is electrically coupled through a small opening in the casing 4 that can be sealed after integration of the solar array 18 with the printed circuit board (PCB) 20. The PCB includes recharging circuitry which controls the charging of the battery 30 by the solar array 18. Preferably, the battery is a rechargeable micro battery or a rechargeable coin battery. The solar array 18 is and the battery 30 are affixed to the casing 12 such that neither are moveable relative to the base. The solar array 18 is wrapped about the base 12 to maximize the solar array's exposure to sunlight. Thus, the base 12 may be of other shapes, such as a conical shape to increase the potential exposure of the array 18 to sunlight. The wrapping of the solar array 18 about the casing 12 allows for the solar array 18 to function independent of orientation of the LED light.

Preferably, an on/off switch 22 is electrically connected to the PCB 20. The on/off switch 22 operates to electrically disconnect the battery 30 from the light source 26. The incorporation of an on/off switch 22 allows for the lights to be conveniently turned off when the lighting assembly is being stored. Alternatively, the on/off switch 22 can operate to disconnect the electrical connection between the solar array 18 and the battery 30 to prevent unnecessary charging of the battery 30 during storage or non-use. Alternatively still, an on/off switch 22 can be linked to one or more lights 10 to simultaneously turn the plurality of lights 10 on or off.

As is also shown in FIG. 1, it is preferred that all of the electrical coupling take place within the confines of the casing 12. In this embodiment, the solar array 18 is connected to the PCB 20 wherein charge control takes place. The PCB 20 is also connected to the energy storage device 30 which then is electrically connected to the LED electrical seat 28. The seat 28 then connects to the LED 8. The bulb 32 encapsulates the end of the casing 12, thus sheltering the electrical connections from the elements. Preferably, the electrical seat 28 is seated on a fabricated piece created to fit within the casing 12.

The light source 26 is preferably an LED 1.8-3.2 VDC device that requires 40 milliamps of current to operate. The characteristics of the LED 26 can be changed to match the current and voltage characteristics of the energy storage device 30. The LED's are DC components and are fed a DC source created by the DC energy collector 18.

The bulb 32 is preferably made of hard see-though plastic that can be manufactured in a variety of colors. Alternatively, the bulb 32 can be made of a uniform color to provide a multitude of lights of the same color. The bulb 32 may be stamped, injection molded or otherwise formed into any desirable shape. Suitable materials include clear and colored transparent plastic or glass. The bulb 32 is preferably manufactured to encase or cover the LED 26 and disperse the light produced by the LED 26. Additionally, the colors projected from the light assembly 10 can be altered by utilizing monochromatic LED's verses the more traditional multi-chromatic light source.

Figure 6:
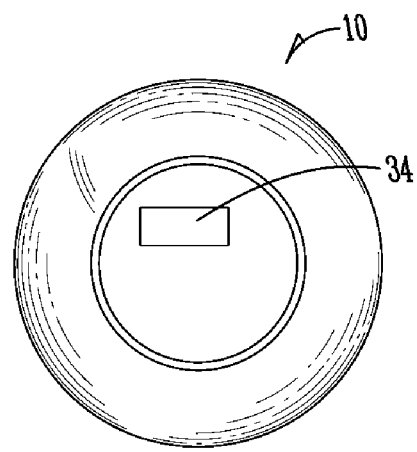
FIG. 6 is a bottom view of a light of one embodiment of the present invention.

Alternatively as shown in FIG. 6, a light sensor 34 may be added to the casing 12 to automatically turn the LED 26 on during times of low light or at night and to automatically turn the light source 26 off during the day. In this manner, the light sensor 24 will help to prevent unneeded power discharge during the prime charging times. The light sensor 34 may be added anywhere on the casing 12, but is preferably added in an area where light from the LED 26 will not cause the light sensor 34 to operate in non-daylight conditions. Thus, the bottom portion of the preferred casing 12 is preferred. Alternatively, the casing 12 may be shaped to provide a shaded area for the light sensor 34, such as under a lip or in a recess.

Figure 2:
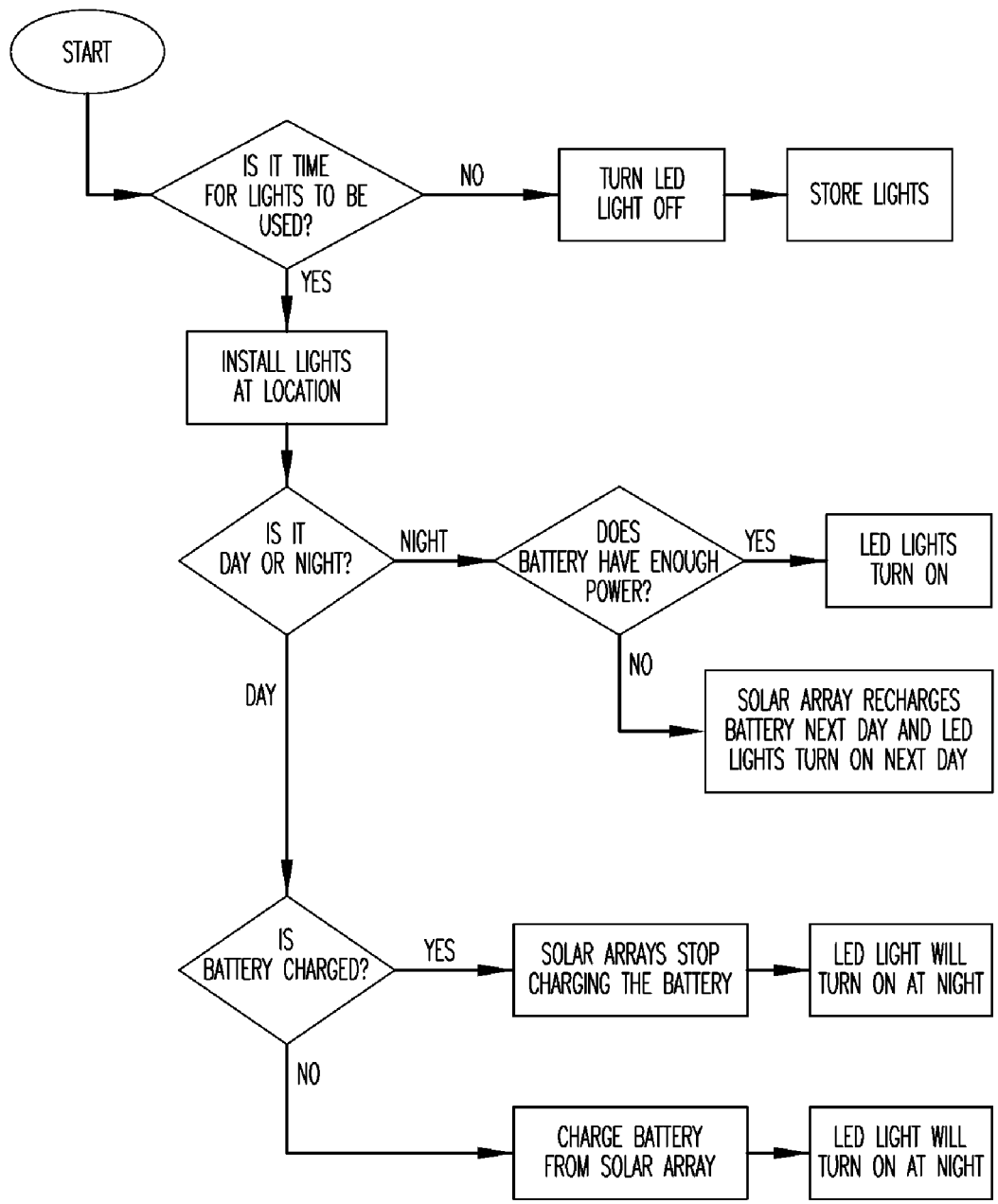
FIG. 2 is a block diagram of the operational flow of the solar powered light of one embodiment of the present invention.

One embodiment of the process used by present invention is detailed in FIG. 2. As shown, initially when a user may decide to use the lighting assembly 10, the on/off switch 22 is turned on and the light assembly 10 or string is installed at the desired location. If the user chooses not to use the light assembly 10, the on/off switch is turned off and the light assembly 10 may be stored. During daylight hours, the solar array 18 recharges the battery 30. If the battery 30 is already fully charged, the electrical circuit of the PCB 20 prevents the overcharge of the battery 30. During the evening hours, the battery 30 will provide the necessary charge to energize the LED 26. The LED 26 will continue to be energized until the battery 30 is fully discharged. At the end of the evening hours, during daylight, the solar array 18 will then recharge the battery 30.

Figure 3:
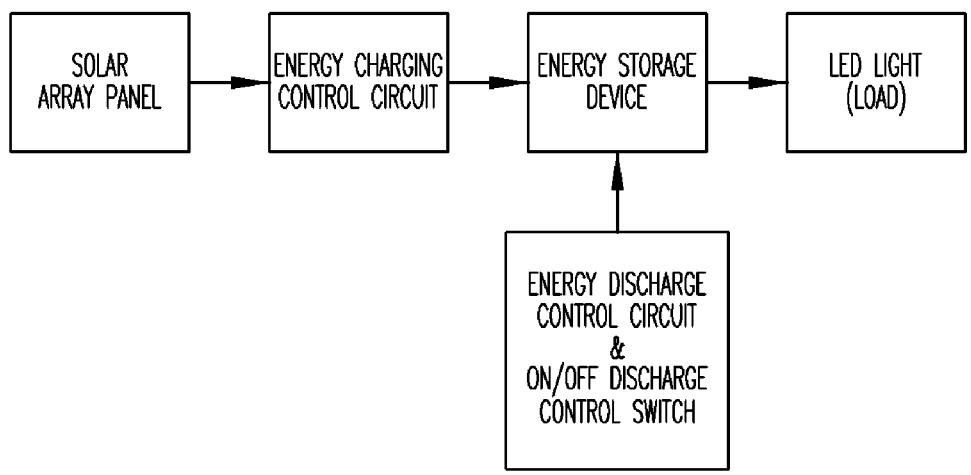
FIG. 3 is a block diagram of the electrical circuit of the solar powered light of one embodiment of the present invention.

FIG. 3 show the electrical charging and discharging process which is controlled by the PCB 20, including the daytime charging by the solar array 18. The solar array 18 sends energy to the energy storage device or battery 30 as controlled by the energy charging control circuit on the PCB 20. Additionally, FIG. 3 shows an energy discharging control circuit which is also on the PCB 20 that controls the flow of energy to the LED 26 from the battery 30. The discharging of the energy control circuit is only operational when the on/off switch 22 is in the on position.

Figure 4:
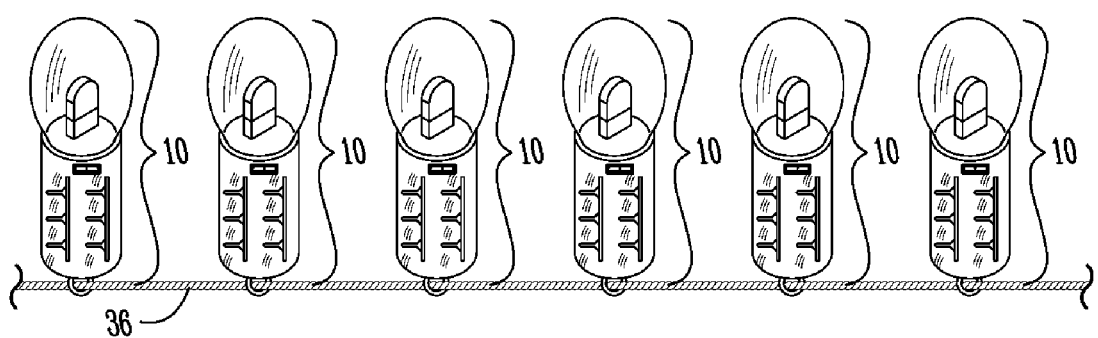
FIG. 4 is a view of a string of the lights of one embodiment of the present invention.
Figure 5:
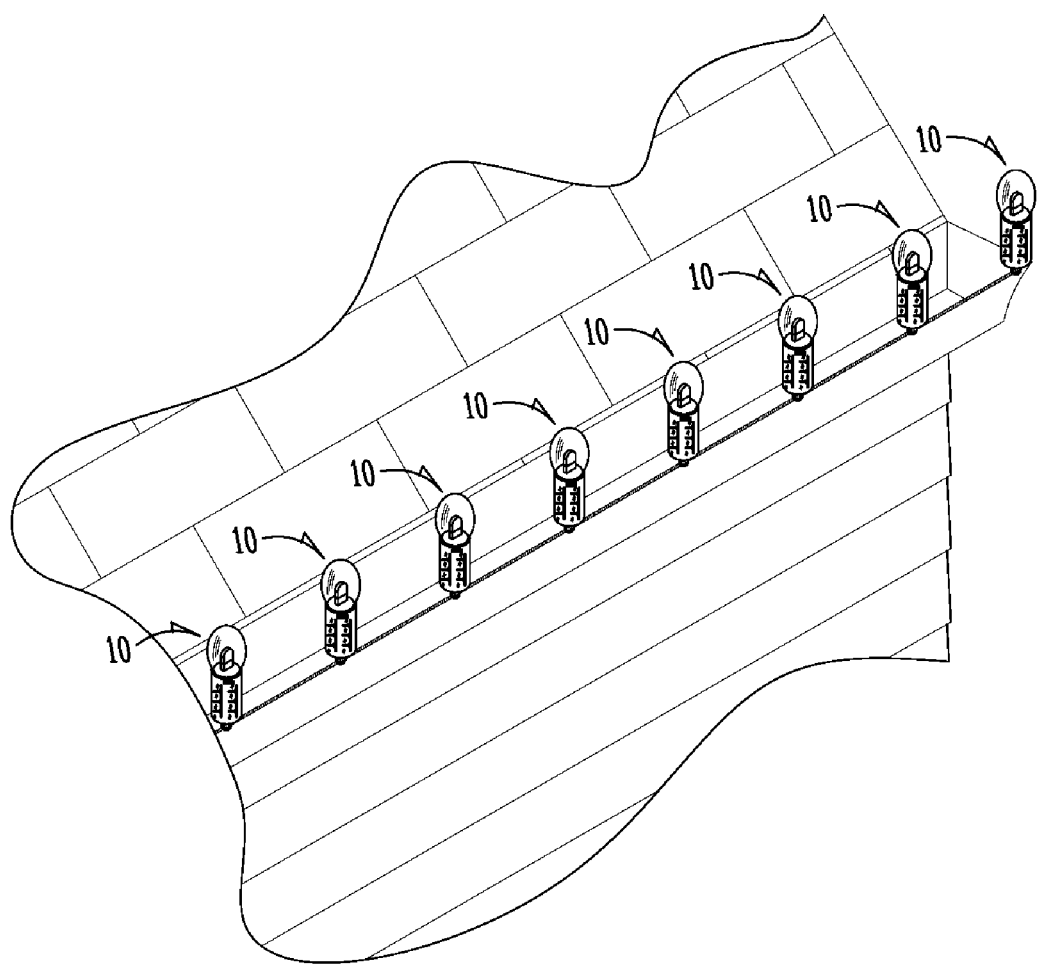
FIG. 5 is a view of a plurality of the lights of one embodiment of the present invention clipped or otherwise secured to the edge of a house roof.

FIG. 4 shows a plurality of the lights 10 attached on a string, plastic line or other support. Because each light 10 is independently powered and independently controlled, there is no need for an electrical connection between each of the lights. Thus, the lights may be arranged in any manner desired by the user. For example, the user can choose to arrange the lights in a star pattern and secure them to a plastic star shaped support. The star shaped support can be designed to be very light weight, to have a very small profile or to be transparent as there is no need to hide any unsightly wiring. Of course, any other shape may be used, such as a Santa, lettering, a desired logo, etc. A general description of the preferred embodiment of the present invention has been described above. The present invention is not to be limited to the specific embodiments described herein but also other variations, options, and alternatives which are within the spirit and scope of the invention.

What is claimed is:

1. A solar powered light, comprising:
   a conical casing,
   a light emitting diode,
   a micro battery,
   a clip attached to the casing,
   a solar cell, wherein the solar cell is a flexible solar cell wrapped forming the conical casing and recharge the micro battery that provides power to the light emitting diode,
   a printed circuit board disposed within the casing and electrically connected to the solar array, and
   a light sensor on the casing for automatically turning the light emitting diode on during time of low light and off during the day.

2. The solar powered light of claim 1 wherein electrical connections between the solar cell, micro battery and the light emitting diode are within the casing.

3. The solar powered light of claim 1 wherein the light emitting diode is monochromatic.

4. The solar powered light of claim 1 wherein a lens encapsulates the light emitting diode within an end of the casing.

5. The solar powered light of claim 1 having an on/off switch that disconnects the light emitting diode from the micro battery.

6. The solar powered light of claim 1 wherein the printed circuit board includes circuitry to control the rate of discharge of the energy storage device.

7. The solar powered light of claim 1 wherein the printed circuit board includes circuitry to control the rate of charge of the micro battery by the solar cell.

8. A string of solar powered lights comprising:
   a plurality of lights, each light including a casino, a light emitting diode extending from the casing, an energy storage device secured within the casing, a printed circuit board operatively connected to the diode, a casing, wherein the casing is a conically wrapped flexible solar cell which recharges the energy storage device that provides power to the light emitting diode, and a light sensor on the casing to automatically control power discharge of the light; and
   a connecting medium for connecting the plurality of lights to one another.

9. The string of solar powered lights of claim 8 wherein the connecting medium is a string.

10. The string of solar powered lights of claim 8 wherein the connecting medium is a wire.

11. The solar powered light of claim 8 wherein a lens covers each light. emitting diode at an end of the casing.

12. The solar powered light of claim 11 wherein a uniform color of lens is used.

13. The solar powered light of claim 11 wherein a variety of colored lenses are used.

14. The solar powered light of claim 8 wherein at least one light produces a single color of light.

15. The solar powered light of claim 8 wherein at least one light produces a white light.

16. The solar powered light of claim 1 wherein the casing has a height and the solar array has a height, wherein the casing height is no greater than the solar array height.

\* \* \* \* \*

UNITED STATES PATENT AND TRADEMARK OFFICE
CERTIFICATE OF CORRECTION

| | | |
|---|---|---|
| PATENT NO. | : 8,002,427 B2 | Page 1 of 1 |
| APPLICATION NO. | : 11/746167 | |
| DATED | : August 23, 2011 | |
| INVENTOR(S) | : Dawn Emily Marilyn Ottman | |

It is certified that error appears in the above-identified patent and that said Letters Patent is hereby corrected as shown below:

Title Pg, Item (75) Inventor:
Delete: "Dawn Emily Marilyn Lavigne"
Add: --Dawn Emily Marilyn Ottman--

Column 6, Line 24:
Delete "casino"
Add: --casing--

Signed and Sealed this
Sixth Day of December, 2011

David J. Kappos
*Director of the United States Patent and Trademark Office*